United States Patent
Gross et al.

(10) Patent No.: US 11,964,267 B2
(45) Date of Patent: Apr. 23, 2024

(54) DISTRIBUTOR DEVICE, METHOD OF GUIDING MATERIALS AND METHOD OF CLEANING A DISTRIBUTOR DEVICE

(71) Applicant: Hüttlin GmbH, Schopfheim (DE)

(72) Inventors: Martin Gross, Steinen (DE); Christian Karl Paasche, Bad Säckingen (DE)

(73) Assignee: Hüttlin GmbH, Schopfheim (DE)

( * ) Notice: Subject to any disclaimer, the term of this patent is extended or adjusted under 35 U.S.C. 154(b) by 878 days.

(21) Appl. No.: 16/978,502

(22) PCT Filed: Jan. 24, 2019

(86) PCT No.: PCT/EP2019/051759
§ 371 (c)(1),
(2) Date: Sep. 4, 2020

(87) PCT Pub. No.: WO2019/170319
PCT Pub. Date: Sep. 12, 2019

(65) Prior Publication Data
US 2020/0398239 A1 Dec. 24, 2020

(30) Foreign Application Priority Data
Mar. 9, 2018 (DE) .................... 10 2018 203 600.4

(51) Int. Cl.
*B01J 8/00* (2006.01)
*A61J 7/00* (2006.01)

(52) U.S. Cl.
CPC .......... *B01J 8/0045* (2013.01); *A61J 7/0084* (2013.01); *B01J 2208/00752* (2013.01);
(Continued)

(58) Field of Classification Search
CPC ............ B01J 8/0045; B01J 2208/00769; A61J 7/0084
See application file for complete search history.

(56) References Cited

U.S. PATENT DOCUMENTS

| 4,250,817 A | 2/1981 | Michel |
| 4,313,386 A | 2/1982 | Boldt |

(Continued)

FOREIGN PATENT DOCUMENTS

| CN | 1860340 A | 11/2006 |
| CN | 101612523 A | 12/2009 |

(Continued)

OTHER PUBLICATIONS

International Search Report with Written Opinion for related application No. PCT/EP2019/051759 dated Apr. 5, 2019 (12 pages).
(Continued)

*Primary Examiner* — Paul J Gray
(74) *Attorney, Agent, or Firm* — Michael Best & Friedrich LLP

(57) ABSTRACT

The invention relates to a distributor device, to a method for guiding materials, and to a method for cleaning a distributor device. The distributor device for guiding materials, in particular particulate pharmaceutical solids, comprises: a process chamber (2) having at least one inlet opening (3) and having at least two outlet openings (4), a distributor element (5) for distributing the materials, wherein the distributor element (5) extends through the process chamber (2) in order to connect the inlet opening (3) to one of the outlet openings (4), wherein the distributor element (5) is arranged rotatably about an axis of rotation (6), and a cleaning apparatus (7) which is configured to clean the process chamber (2) and the distributor element (5).

18 Claims, 3 Drawing Sheets

(52) U.S. Cl.
CPC .............. *B01J 2208/00769* (2013.01); *B01J 2208/00938* (2013.01); *B01J 2219/00247* (2013.01)

(56) References Cited

U.S. PATENT DOCUMENTS

| | | |
|---|---|---|
| 6,644,847 B2 | 11/2003 | Boos |
| 2007/0012379 A1 | 1/2007 | El-Rayes et al. |
| 2010/0092274 A1 | 4/2010 | Rudner et al. |

FOREIGN PATENT DOCUMENTS

| | | |
|---|---|---|
| CN | 101723166 A | 6/2010 |
| DE | 3418325 A1 | 11/1985 |
| DE | 10 2014 103 661 A1 | 9/2015 |
| FR | 2736701 A1 | 1/1997 |
| WO | 2011073838 A1 | 6/2011 |

OTHER PUBLICATIONS

The State Intellectual Property Office of People's Republic of China First Office Action for Application No. 201980017811.3 dated Nov. 26, 2021 (14 pages including English translation).
Intellectual Property India Examination Report for Application No. 202017035799 dated Mar. 7, 2022 (5 pages including English translation).

DISTRIBUTOR DEVICE, METHOD OF GUIDING MATERIALS AND METHOD OF CLEANING A DISTRIBUTOR DEVICE

BACKGROUND

The present invention relates to a distributor device for guiding materials, in particular particulate pharmaceutical solids. The invention further relates to a method for guiding materials and further to a method for cleaning a distributor device.

A variety of devices for distributing materials are known from the prior art. However, they are usually structurally complex, expensive and difficult to operate. In addition, they can only be cleaned with a lot of effort and cannot be cleaned when installed, but must be removed. This means that these devices can often only be cleaned completely and without residue if the user intervenes.

For example, a multi-port ball valve is known from DE 10 2014 103 661 A1 which, however, must be removed for cleaning. In addition, large driving forces may be necessary to adjust this multi-port ball valve.

In addition, with known devices, there is often the problem of carryover of material residues into other chambers and contamination of cracks in sealing spaces or undercuts. For complete cleaning, these devices usually have to be dismantled.

SUMMARY

By contrast, the distributor device according to the invention has the advantage that it is easy to guide materials and also allows cleaning the device in the installed state and without manual intervention. In particular, particulate pharmaceutical solids, material flows or portions from one or more sources can be selectively guided to a plurality of recipients. This is achieved by means of a distributor device which comprises a process chamber having at least one inlet opening and at least two outlet openings.

The materials in the distributor device are preferably guided selectively from an inlet opening to one of the outlet openings and thus distributed. However, it is also possible to transport the materials in the opposite direction, i.e. to collect them. In this case, the materials are guided selectively from one of the outlet openings to the inlet opening.

The process chamber preferably has three or up to six or more outlet openings. The inlet openings and the outlet openings can, for example, be round or elliptical in design. For example, a space delimited by a spherical, cylindrical or other rotationally symmetrical housing can be regarded as the process chamber.

The materials are preferably transported gravimetrically or pneumatically. A combination of gravimetric and pneumatic transport is still possible as well. In particular, the materials can be transported by means of negative pressure or positive pressure.

Furthermore, the distributor device has a distributor element. The distributor element extends through the process chamber and connects an inlet opening to one of the outlet openings.

The distributor element is arranged rotatably about an axis of rotation. The different outlet openings, or outlet openings and inlet openings, can be approached by a rotation about the axis of rotation, so that a selective guiding of the materials by means of the distributor element is possible. The distributor element can, for example, be rotated via a drive shaft which is driven by a drive motor.

In an embodiment having a plurality of inlet openings and a plurality of, in particular up to six, outlet openings, the axis of rotation runs through the center points of circular paths on which the inlet openings and the outlet openings of the process chamber are located. The inlet openings and the outlet openings can be regularly distributed over the circular paths, or they can also be located next to one another on the respective circular paths.

The distributor device further comprises a cleaning apparatus, which is configured to clean the process chamber and the distributor element, in particular all surfaces in contact with the product. In particular, the cleaning apparatus can automatically introduce a cleaning agent into the process chamber and into the distributor element, as a result of which manual cleaning and, in particular, complex disassembly for cleaning the components is avoided. The special design and interaction of the process chamber, distributor element and cleaning apparatus makes it possible to clean the distributor device on-site.

A particularly compact and simple device for guiding materials can be provided by the distributor device according to the invention. The distributor device can be cleaned automatically and without disassembly and thus allows inexpensive and efficient processing of materials.

The process chamber preferably has exactly one inlet opening. In this case, the axis of rotation runs through the inlet opening and the distributor element is connected to the inlet opening. By rotating around the axis of rotation, materials can be selectively distributed from the single inlet opening to the outlet openings.

Furthermore, it is advantageous if the distributor device comprises at least two, in particular up to six, inlet openings. This means that different sources and receivers can be selectively connected to one another, which allows guiding materials in complex systems. In this case, the distributor element comprises a first distributor element portion and a second distributor element portion and a rotary coupling. The rotary coupling is arranged between the two distributor element portions in order to connect them rotatably to one another. The distributor device preferably has two drive shafts and two drive motors, by means of which a distributor element portion is rotated in each case. The two distributor element portions can thus rotate independently of one another about the axis of rotation, so that the inlet openings and the outlet openings can be connected to one another as desired through the distributor element.

The process chamber preferably has a drainage floor in order to guide liquid out of the process chamber through the outlet openings. The drainage floor is preferably curved, in particular partially spherical, and is arranged within the process chamber and at the outlet openings in such a way that liquids, in particular the cleaning agent, can drain completely out of the process chamber. In this way, undercuts or crevices at which remnants of the materials to be guided can accumulate can be avoided in a simple manner.

The drainage floor is preferably arranged rotatably about the axis of rotation and connected to the distributor element, in particular by means of an arm. This allows a particularly simple drive, in particular of the drive which rotates the distributor element.

Furthermore, it is particularly advantageous if the distributor device further comprises a seal which is arranged at a free end of the distributor element. The seal is configured to produce a material-tight seal between the distributor element and the outlet opening. A seal makes it particularly easy to ensure that the materials to be guided are prevented from inadvertently escaping. In an embodiment having a plurality of inlet openings, the distributor device may also comprise a further seal which is arranged at a further free end of the distributor element in order to produce a material-tight seal between the distributor element and the inlet opening.

The seal is preferably inflatable and configured to produce a material-tight seal between the distributor element and the outlet opening by pressurization with compressed air. Compressed air is fed to the seal via a compressed air inlet. An inflatable seal can be used to produce a particularly simple and effective seal. Inflation increases the volume of the seal, the seal expanding in particular in the direction of the outlet opening and tightly fitting around the outlet opening. After loosening the seal by release of the compressed air, the volume of the seal decreases again, which creates a gap between the seal and the outlet opening. This allows a very smooth rotation of the distributor element because, for example, grinding of the seal against a wall of the process chamber is avoided. Similarly, if there is a plurality of inlet openings, a material-tight seal can be produced between the distributor element and inlet opening by means of a further inflatable seal.

The distributor element is particularly preferably a curved section of pipe or a hose. This allows a particularly favorable design of the process chamber and the distributor element. In addition, the materials can be transported efficiently thanks to the curved shape. A curved section of pipe can be connected, for example, to a drive shaft, which extends through the drainage floor. In the case of a hose as a distributor element, it is particularly expedient if it is connected to a rotatable drainage floor, in particular by means of an arm. In this case, rotation about the axis of rotation can be achieved by driving the drainage floor by means of a drive motor. A movable surface of the hose has a particularly favorable effect on cleaning the inner surface. In addition, the hose is easy and inexpensive to change, as a result of which the distributor device can be easily adapted to guide various substances, for example highly active or aggressive substances.

The distributor element is preferably double-walled. The two walls of the distributor element delimit an annular channel, the cross-sectional area of this annular channel being significantly smaller than the circular channel delimited by the inner wall, through which the materials are guided. The seal is supplied with compressed air via the ring channel. In this case, the compressed air inlet can be close to the inlet opening of the distributor device, preferably outside the process chamber. The double-walled distributor element allows a particularly favorable and flexible design of the compressed air supply or of the entire distributor device.

The cleaning apparatus further preferably has at least one nozzle for introducing a cleaning agent into the process chamber. The nozzle is attached to the process chamber, for example at a border near the inlet opening. The cleaning agent can be introduced and metered very specifically by means of the nozzle.

The invention further relates to a method for distributing materials, in particular particulate pharmaceutical solids, by means of the distributor device. The method includes the steps:
rotating the distributor element about the axis of rotation to connect an inlet opening to one of the outlet openings, and
conveying the materials via the inlet opening and by means of the distributor element through the process chamber and via the outlet opening out of the process chamber. It is particularly advantageously possible to distribute or meter a specific substance by means of the distributor device to a plurality of outlets which are connected to the outlet openings.

Furthermore, the invention also leads to a method for collecting materials, in particular particulate pharmaceutical solids, by means of the distributor device. The method includes the steps:
rotating the distributor element about the axis of rotation to connect an inlet opening to one of the outlet openings, and
conveying the materials via the outlet opening and by means of the distributor element through the process chamber and via the inlet opening out of the process chamber.

It is particularly advantageously possible to collect a plurality of different materials by means of the distributor device from a plurality of entry portals which are connected to the outlet openings, and to remove them with a single outlet which is connected to the inlet opening.

The method also particularly preferably comprises the step:
inflating the seal by means of compressed air to produce a material-tight seal between the distributor element and the outlet opening, or the outlet opening and the inlet opening.

It is considered particularly advantageous if the materials are conveyed gravimetrically and/or pneumatically. In this case, a negative pressure can preferably be used to suck the materials through the distributor device, or a positive pressure to press the materials through the distributor device.

The invention further relates to a method for cleaning the distributor device. The method includes the steps:
conveying a cleaning agent into the distributor element via an inlet opening,
alternately conveying the cleaning agent by means of the distributor element via the outlet openings out of the process chamber,
conveying the cleaning agent via the nozzle into the process chamber, and
conveying drying air into the process chamber and into the distributor element, wherein the distributor device is cleaned without dismantling the distributor device and without manual intervention.

The drying air should be as dry as possible (in the range of 1-10 g of water per kg of air) and warm (in the range of 30-90° C.) in order to absorb a lot of moisture in a short time. The method can be carried out automatically and without user intervention. Due to the corresponding design of the distributor device, it is possible with this method to achieve a completely residue-free cleaning of the distributor device without disassembly.

BRIEF DESCRIPTION OF THE DRAWINGS

The invention is described below on the basis of embodiments in conjunction with the figures. In the figures, functionally identical components are identified with the same reference signs. In the drawings.

DETAILED DESCRIPTION

Figure 1:
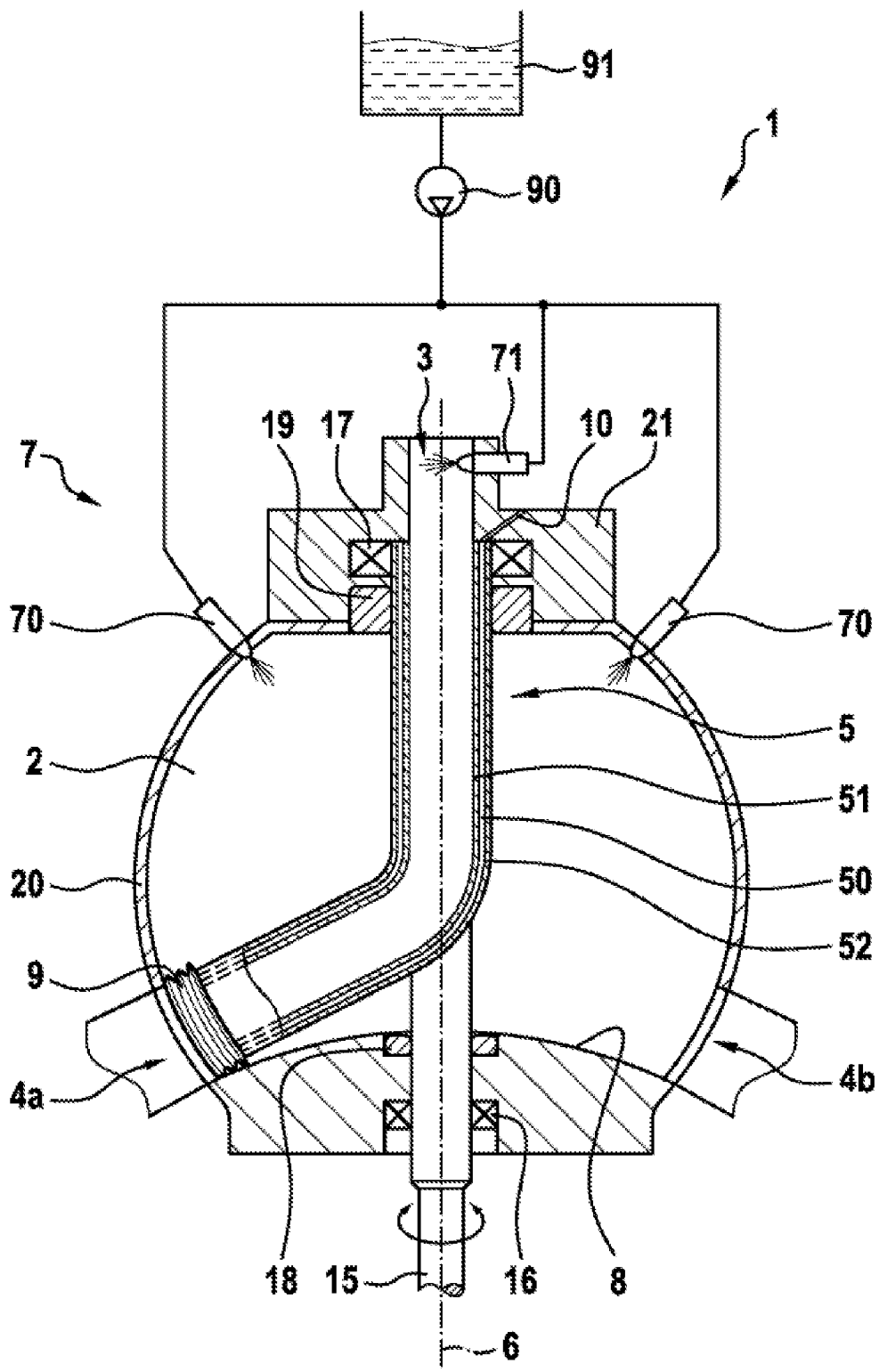
FIG. 1 is a simplified schematic view of a distributor device according to a first embodiment of the invention.

FIG. 1 shows a distributor device 1 according to a first embodiment.

A process chamber 2 is formed by an essentially spherical housing 20 with a cover 21 and a curved drainage floor 8. The process chamber 2 has a single inlet opening 3. In the first embodiment, the process chamber 2 has a first outlet opening 4a and a second outlet opening 4b, which are situated opposite one another. Further outlet openings can also be provided.

A distributor element 5 is connected to the inlet opening 3. Through the inlet opening 3 runs an axis of rotation 6, about which the distributor element 5 is rotatably arranged. The distributor element is curved in FIG. 1 and arranged in such a way that it connects the inlet opening 3 to the first outlet opening 4a. The outlet openings 4a and 4b lie on the circumference of a circle which lies in a plane perpendicular to the axis of rotation 6. Thus, the distributor element 5 can be optionally connected to the first outlet opening 4a or to the second outlet opening 4b by rotation about the axis of rotation 6.

The distributor element 5 has an inflatable seal 9 at its free end in order to produce a material-tight seal with the outlet opening 4a. The inflatable seal 9 is formed, for example, from a rubber or rubber-like material and shaped like a bellows. If the seal 9 is pressurized with compressed air, its volume increases until the seal 9 rests against the inside of the housing 20 and thus produces the material-tight seal between the distributor element 5 and the outlet opening 4a. This state is shown in the figures. Compressed air is released to loosen the seal, as a result of which the volume of the seal 9 is reduced again. A rotation of the distributor element 5 is then possible without, for example, the seal 9 rubbing against the inner wall of the housing 20.

Thus, only very low driving forces are necessary for the distributor element 5 to rotate.

In the first embodiment in FIG. 1, the distributor element 5 is a rigid, curved section of pipe and, at the apex of the elbow, is fixedly connected to a drive shaft 15 which drives the distributor element 5. A drive motor, which is not shown, can transmit a torque to the drive shaft 15 and thus cause the distributor element 5 to rotate.

Furthermore, the distributor element 5 is double-walled. An inner wall 51 defines a circular channel through which the materials to be transported are guided. An annular channel 50 is enclosed by the inner wall 51 and an outer wall 52, wherein the cross-sectional area of the annular channel 50 is significantly smaller than the cross-sectional area of the circular channel delimited by the inner wall 51. The inflatable seal 9 is supplied with compressed air via the annular channel 50. The annular channel 50 is connected to a compressed air inlet 10, which is close to the inlet opening 3 and extends through the cover 21. For example, the compressed air inlet 10 can be a borehole which extends through the cover 21 and always has a connection to the annular channel 50, even when the distributor element 5 rotates.

To seal the process chamber 2 as well as the annular channel 50, a seal 19 is provided in the cover 21, wherein the compressed air inlet 10 leads past the seal 19.

Furthermore, a bearing 17 is provided for mounting the distributor element 5 in the cover 21. A further seal 18 and a further bearing 16 are arranged on the side opposite the inlet opening 3, for sealing the process chamber 2 or for mounting the drive shaft 15. The seal 18 and the bearing 16 are provided in the drainage floor 8.

The curved drainage floor 8 has a partially spherical design and allows liquid to drain completely out of the process chamber 2 through the outlet openings 4a, 4b. For this purpose, the drainage floor 8 is arranged in such a way that there is a continuous transition from the drainage floor 8 to the outlet openings 4a, 4b. With a vertical alignment of the distributor device 1, that is to say when the axis of rotation 6 runs in the vertical direction as shown in FIG. 1, a smooth transition from the lowest points of the drainage floor 8 to the outlet openings 4a, 4b is thus provided. As a result, liquid can run out of the process chamber 2 unhindered, and liquid or residues of the materials to be transported, in particular during cleaning, are prevented in a simple manner from accumulating at undercuts in the interior of the process chamber 2.

Thus, the prerequisites for a complete cleaning of the distributor device 5, in particular its surfaces in contact with the product, are met without dismantling the distributor device 1 and without manual intervention. The other elements and steps for carrying out the cleaning process are described below.

For complete and automatic cleaning, the distributor device 1 comprises a cleaning apparatus 7, which in the embodiment shown in FIG. 1 is implemented as nozzles 70, 71 that can introduce a cleaning agent. Two nozzles 70 are arranged on the housing 20 adjacent to the cover 21 and opposite one another with respect to the axis of rotation 6 in order to achieve the best possible distribution of the cleaning agent within the process chamber 2. The cleaning agent can, as described, drain completely via the outlet openings 4a, 4b by means of the drainage floor 8. The material guiding parts, that is to say the inlet opening 3, the inner circular channel of the distributor element 5 and the outlet openings 4a, 4b, can be cleaned by introducing the cleaning agent into the inlet opening 3. For this purpose, a further nozzle 71 is provided near the inlet opening 3 in the illustrated embodiment. However, it is also possible to introduce the cleaning agent directly into a feed line (not shown) via which the materials to be guided are also fed to the inlet opening 3. In this case, the nozzle 71 is not necessary for injecting into the distributor element 5. The cleaning agent is supplied to the nozzles 70, 71 by means of a pump 90, which draws the cleaning agent from a cleaning agent tank 91.

By alternately conveying the cleaning agent through the distributor element 5 and through each of the outlet openings 4a, 4b out of the process chamber 2, these parts can also be cleaned completely and automatically.

After cleaning the distributor device 5 with the cleaning agent, the distributor device 5 is supplied with drying air which is as warm (in the range of 30-90° C.) and dry (in the range of 1-10 g of water per kg of air) as possible. Like the cleaning agent, the drying air can be introduced, for example, via nozzles 70 on the housing 20 and a further nozzle 71 near the inlet opening 3 or via a feed line (not shown) to the inlet opening 3.

Figure 2:
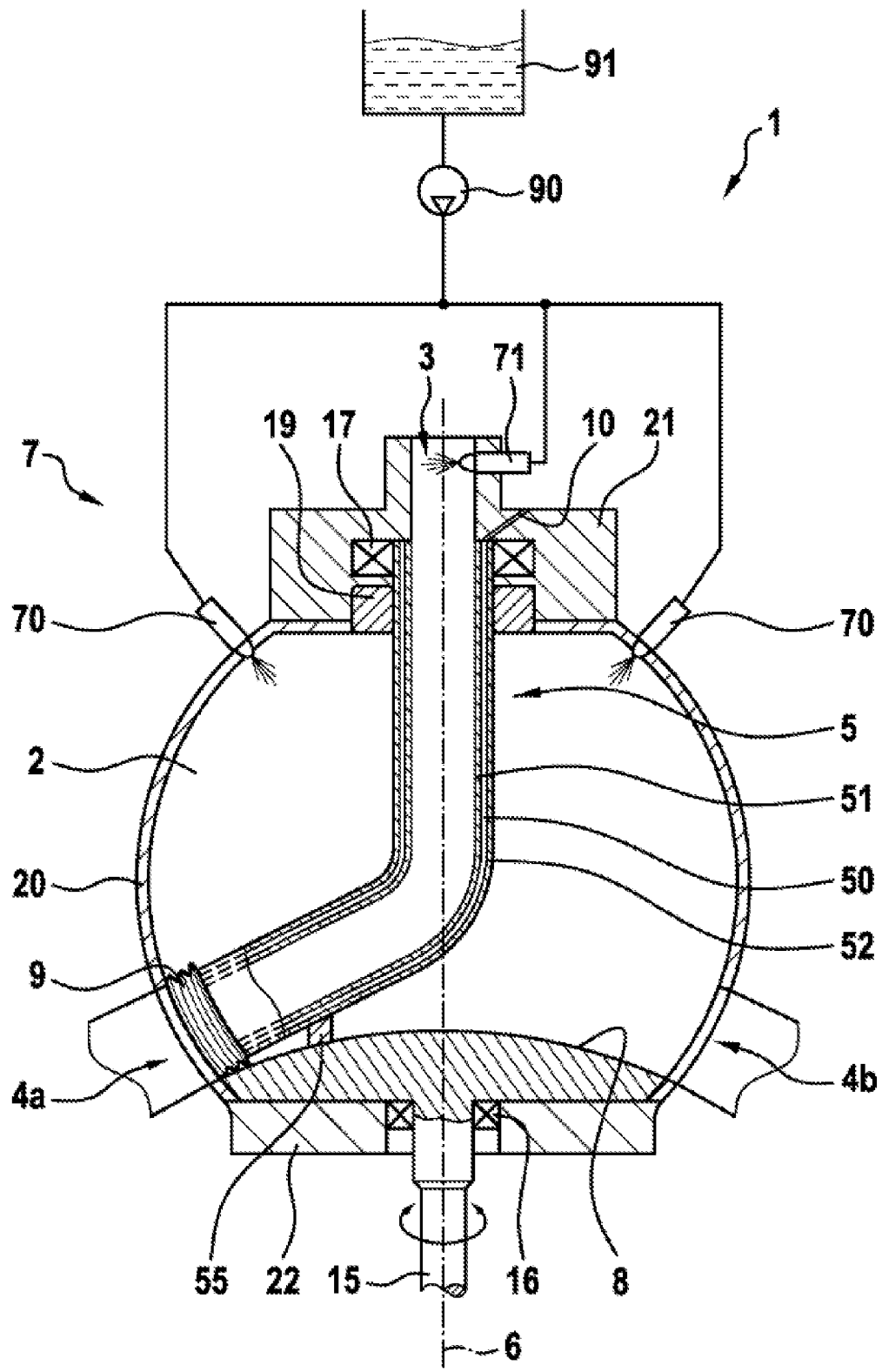
FIG. 2 is a simplified schematic view of a distributor device according to a second embodiment of the invention.

A second embodiment of the distributor device 1 is shown in FIG. 2. The second embodiment differs from the first embodiment in particular by a shortened shaft 15, a rotatable drainage floor 8 and an alternative fastening of the distributor element 5. The distributor element 5 is firmly connected to the rotatable drainage floor 8 by means of a connecting element 55, in particular in the form of an arm. The further configuration is essentially the same as the first embodiment.

In the second embodiment, the rotatable drainage floor 8 is connected directly to the shortened drive shaft 15. The drive shaft 15 is supported in a further base 22 which is fixedly connected to the housing 20 by means of a bearing 16.

The distributor element 5 is fixedly connected to the drainage floor 8 by means of the connecting element 55 near its free end at which the inflatable seal 9 is arranged. Such a design is particularly advantageous if the distributor element 5 is a hose. Due to the fastening near the free end, the distributor element 5 is always positioned relative to the outlet openings 4a, 4b in such a way that, despite the flexibility of the hose, a leak-free connection of the distributor element 5 to the outlet openings 4a, 4b is possible.

Figure 3:
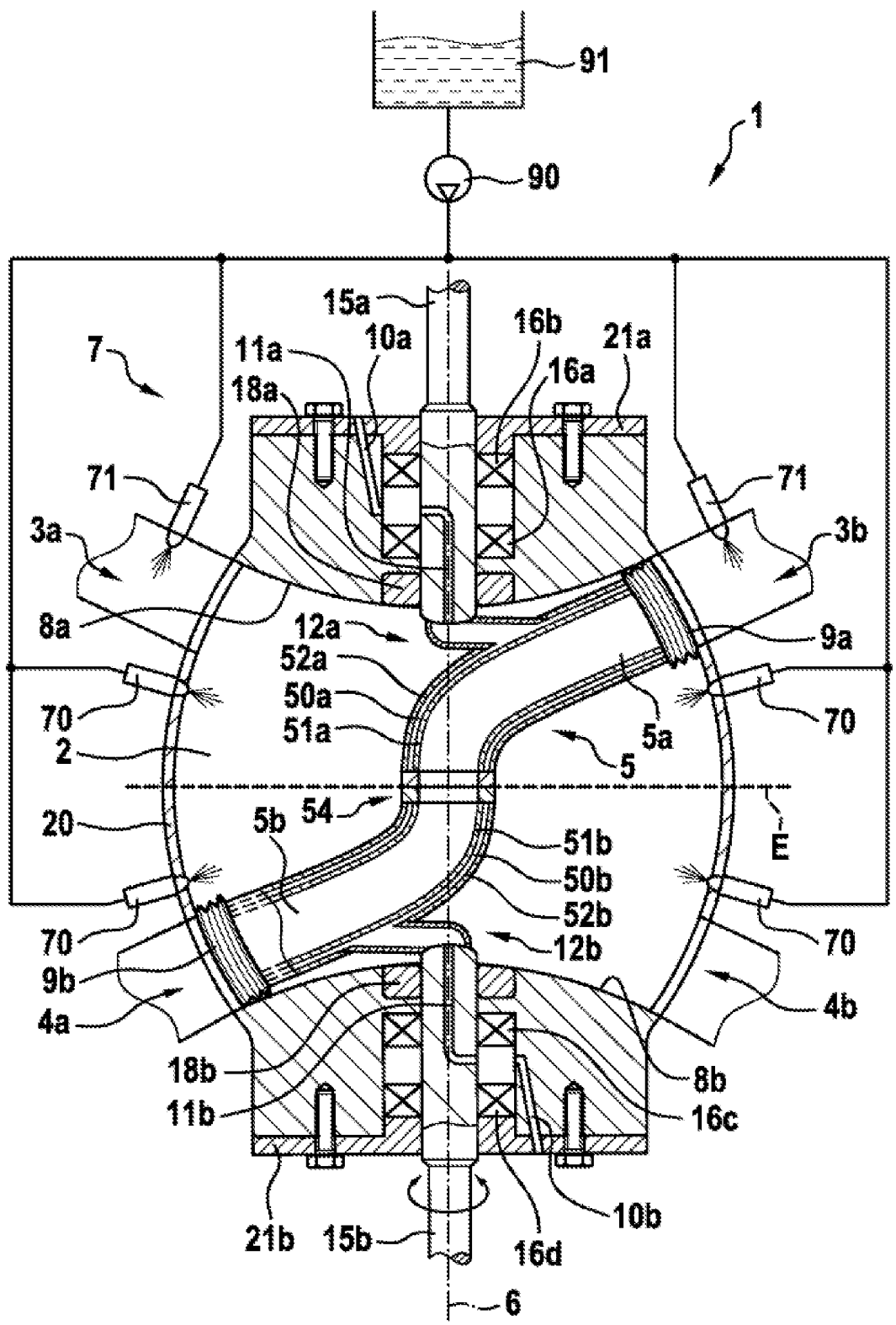
FIG. 3 is a simplified schematic view of a distributor device according to a third embodiment of the invention.

FIG. 3 shows a third embodiment of the distributor device 1 according to the invention. This shows a possibility of guiding materials from a plurality of inlet openings 3a, 3b to a plurality of outlet openings 4a, 4b. In FIG. 3, two inlet openings 3a, 3b and two outlet openings 4a, 4b are shown as examples. The distributor element 5 is designed in two parts, with a first distributor element portion 5a and a second distributor element portion 5b, which are rotatably connected to one another by means of a rotary coupling 54. The two distributor element portions 5a, 5b are rotatable independently of one another by means of separate drives via two drive shafts 15a, 15b. The distributor element 5 has two free ends, each of which has an inflatable seal 9a, 9b, for material-tight sealing with one of the inlet openings 3a, 3b and with one of the outlet openings 4a, 4b.

Thus, the distributor device 1 is substantially symmetrical to a plane E, which is perpendicular to the axis of rotation 6 and which is situated centrally on the rotary coupling 54, wherein nozzles 70, 71 are arranged only on the process chamber 2 and near the inlet openings 3a, 3b and not near the outlet openings 4a, 4b.

In the third embodiment, the two drive shafts 15a, 15b are each mounted in the drain floors 8a, 8b by means of two bearings 16a, 16b and 16c, 16d. In addition, alternative configurations of the compressed air supply and the connection of the drive shafts 15a, 15b to the distributor element portions 5a, 5b are shown. Compressed air is supplied via a borehole 11a, 11b within the drive shafts 15a, 15b. The distributor element portions 5a, 5b are connected to the drive shafts 15a, 15b via radially extending pipe elements 11a, 11b, which also allow compressed air to be supplied to the ring channels 50a, 50b of the distributor element portions 5a, 5b.

It should be noted that these alternative possibilities of mounting by means of two bearings, the compressed air supply via the drive shaft and the fastening of the distributor element by means of pipe elements can also be implemented in the first and second embodiments. Likewise, the third embodiment can have only one bearing for mounting the drive shafts, for example.

The invention claimed is:

1. A distributor device for guiding materials, the device comprising:
a process chamber (2) having at least one inlet opening (3) and having at least two outlet openings (4),
a distributor element (5) for distributing the materials, wherein the distributor element (5) extends through the process chamber (2) in order to connect the inlet opening (3) to one of the outlet openings (4), wherein the distributor element (5) is arranged rotatably about an axis of rotation (6),
a cleaning apparatus (7) which is configured to clean the process chamber (2) and the distributor element (5), wherein the cleaning apparatus (7) has a nozzle (70), and wherein the nozzle (70) is arranged on the process chamber (2) for introducing a cleaning fluid into the process chamber (2), and
a seal (9) which is arranged at a free end of the distributor element (5),
wherein the seal (9) is inflatable and is configured, by pressurization with compressed air via a compressed air inlet (10), to produce a material-tight seal of the distributor element (5) at the outlet opening (4), or at the outlet opening (4) and at the inlet opening (3).

2. The distributor device according to claim 1, wherein the at least one inlet opening (3) is only a single inlet opening (3) of the process chamber (2), wherein the distributor element (5) is connected to the inlet opening (3), and wherein the axis of rotation (6) runs through the inlet opening (3).

3. The distributor device according to claim 1, wherein the at least one inlet opening (3) is at least two inlet openings (3) of the process chamber (2), wherein the distributor element (5) comprises a first distributor element portion (5a), a second distributor element portion (5b) and a rotary coupling (54), and wherein the rotary coupling (54) is arranged between the first distributor element portion (5a) and the second distributor element portion (5b), for rotatably connecting the two distributor element portions (5a, b).

4. The distributor device according to claim 1, wherein the process chamber (2) has a drainage floor (8) configured to guide liquid out of the process chamber (2) through the outlet openings (4).

5. The distributor device according to claim 4, wherein the drainage floor (8) is arranged rotatably about the axis of rotation (6) and is connected to the distributor element (5).

6. The distributor device according to claim 1, wherein the distributor element (5) is double-walled, and wherein compressed air is supplied to the seal (9) via an annular channel (50), which is formed by the double wall of the distributor element (5).

7. The distributor device according to claim 1, wherein the distributor element (5) is a curved section of pipe or a hose.

8. The distributor device according to claim 4, wherein the drainage floor (8) is at least partially spherical.

9. A method for distributing materials by means of a distributor device according to claim 1, comprising the steps of:
rotating the distributor element (5) about the axis of rotation (6), for connecting an inlet opening (3) of the at least one inlet opening (3) to one of the outlet openings (4), and
conveying the materials via the inlet opening (3) and by means of the distributor element (5) through the process chamber (2) and via the outlet opening (4) out of the process chamber (2).

10. The method according to claim 9, further comprising the step of:
inflating the seal (9) that is arranged at the free end of the distributor element (5) by means of compressed air in order to produce the material-tight seal of the distributor element (5) at the outlet opening (4), or at the outlet opening (4) and at the inlet opening (3).

11. The method according to claim 9, wherein the materials are conveyed gravimetrically and/or pneumatically.

12. The method according to claim 9, further comprising the steps of:
conveying the cleaning fluid into the distributor element (5) via the inlet opening (3) of the at least one inlet opening (3), alternately conveying the cleaning fluid by means of the distributor element (5) via the outlet openings (4) out of the process chamber (2), conveying the cleaning fluid through the nozzle (70) into the process chamber (2), and conveying drying air into the process chamber (2) and into the distributor element (5), wherein the distributor device is cleaned without dismantling the distributor device and without manual intervention.

13. The method according to claim 11, wherein the materials are conveyed by negative pressure or positive pressure.

14. A method for collecting materials by means of a distributor device according to claim 1, comprising the steps of:

rotating the distributor element (5) about the axis of rotation (6), for connecting an inlet opening (3) of the at least one inlet opening (3) to one of the outlet openings (4), and conveying the materials via the outlet opening (4) and by means of the distributor element (5) through the process chamber (2) and via the inlet opening (3) out of the process chamber (2).

15. The method according to claim 14, further comprising the step of:

inflating the seal (9) that is arranged at the free end of the distributor element (5) by means of compressed air in order to produce the material-tight seal of the distributor element (5) at the outlet opening (4), or at the outlet opening (4) and at the inlet opening (3).

16. The method according to claim 14, wherein the materials are conveyed gravimetrically and/or pneumatically.

17. The method according to claim 16, wherein the materials are conveyed by negative pressure or positive pressure.

18. The distributor device according to claim 1, wherein the cleaning fluid is a liquid.

* * * * *